Patented Apr. 19, 1927.

1,625,458

UNITED STATES PATENT OFFICE.

PHILIP C. DONNER, OF SUMMIT, NEW JERSEY.

CARROTING FUR AND ART OF TREATING THE SAME.

No Drawing.   Application filed April 28, 1925. Serial No. 26,542.

This invention has reference, generally, to improvements in treated fur or similar material, and, furthermore, to the art of treating the same, to produce a material which is especially adapted to manufacture of felt therefrom.

The invention has for its principal object to provide fur, or the like, having certain characteristics or properties in a high degree, such as the production of a perfect and homogeneous mass of fur, which while in compact form possesses great softness, and has a better shrinking effect or quality in producing the felt, than fur treated by the carroting methods now ordinarily in use.

Other objects are to provide material of the above nature especially adapted for the practical manufacture of felt and possessing certain qualities whereby efficient dyeing is facilitated and whereby a lower grade of raw material may be used. Another object is to provide material of the above nature capable of forming felt in a highly efficient and satisfactory manner and which is substantially free from harmful ingredients. Another object is to provide a practical and effective art of treating fur or material of a similar nature whereby the same may be prepared in a highly satisfactory manner for the manufacture of felt therefrom. Other objects will be in part obvious or in part pointed out hereinafter.

The invention accordingly consists in the features of composition, constitution of parts and in the several steps and relation and order of each of the same to one or more of the others thereof, all as will be illustratively described herein and the scope of the application of which will be indicated in the following claims.

As conducive to a clear understanding of the several features of this invention, it may be here noted that the subject matter of this invention deals primarily with material such as fur or similar fibrous animal products treated or prepared principally for the manufacture of felt therefrom, as for example for the manufacture of felt hats, and with the art of carrying on such treatment. Fur or similar material as it comes from the animal is ordinarily in its natural state not suitable for the manufacture of felt and when it reaches the hands of the felt manufacturer, it has been subjected to a preparatory treatment adapted to bring out certain desired qualities for felting. The broad idea of such preliminary treatment or preparation is commonly known as carroting and the fur after such treatment is commonly known as carroted fur. The formation of felt from fur or the like is brought about by the individual fibres in contact with each other overlapping and interlocking and it is to increase this tendency of the fur to work together and interlock that the carroting process is resorted to.

In the manufacture of felt, as for example in the manufacture of felt hats, the fur is continually handled throughout the different processes, many of the processes involving the application of hot water and steam, and therefore a fur which in the carroting process has been impregnated with a poisonous material is extremely objectionable. The material commonly employed at the present time as a carroting substance is mercuric nitrate, prepared from nitric acid and mercury. Fur which has been treated with such a carroting material is, when it comes to the felt manufacturer, impregnated with a poisonous acid substance and the poisonous fumes which are released therefrom during the processes of felt manufacture are highly objectionable and unhealthful. In addition to the objectionable poisonous character of fur treated with such material, the fur is apt to be roughened or partially disintegrated as a result of the strong acid treatment. The provision of treated furs or the like which are efficiently prepared to have the properties most desired for felting, which are free from poisonous ingredients and which are characterized by other advantageous qualities is among the dominant aims of this invention.

The carroting process is most conveniently carried out by brushing the carroting material into the fur in the form of a solution.

The preferred form of carroting substance employed in carrying out the principles of the present invention comprises a solution of a mixture of nitric acid and tannic acid, with a view of replacing the objectionable use of mercury, which is of damaging and injurious effect upon the health of the workman.

In carrying out or forming the solution, I take nitric acid in suitable proportion by weight, say 100 pounds, placing the same into a suitable tank or container. I then add thereto, tannic acid, usually in powder-form, using 11 pounds, more or less according to the strength of the solution desired, to the nitric acid. By agitation or stirring a perfect mixture or solution is produced, this mixture then being suitably heated to about 100 degrees Fahrenheit. After a time, the liquid mixture or solution is allowed to cool, and water is thereupon added thereto, so as to obtain a strength of the solution which may vary from 1 to 15 degrees Baumé.

The process of applying the carroting material to the fur may be carried on while the fur is still upon the skin or it may be carried on after the fur has been removed from the skin or pieces. The preferred method is to apply the carroting solution to the fur upon the skin. In accordance with this method, the solution is preferably applied to the fur by means of a brush, care being taken to thoroughly brush the material into the fur and evenly treat all parts thereof. The fur is then dried and is then ready for removal and other steps in the manufacture of felt. In the other method, namely that of applying the carroting material to the fur after it is removed from the skin or pieces, the process consists preferably of immersing the loose fur in the solution and then drying the fur. In the first mentioned method, namely that of brushing the solution into the fur on the skin, a much stronger solution of the carroting material is required than in the second method wherein the loose fur is immersed in the solution.

Thus, it will be evident, that the proportions of the materials employed may be suitably varied, and the degrees of diluting the solution of the nitric acid and the tannic acid may be varied anywhere between 1 and 15 degrees Baumé, and in some instances it may even be desirable to use a higher degree of Baumé.

The non-poisonous character of the carroted fur renders it far more suitable for handling and far more healthful from the standpoint of workmen who come into continual contact with the fur during the process of felt manufactured therefrom than is fur carroted by the usual nitrate of mercury process.

From the above, it will be seen that there is herein provided an art of preparing fur or similar material which attains many distinct, practical and useful advantages and which is particularly well adapted for application to practical use. Furthermore, the resulting product is one which embodies many qualities greatly to be desired in such material.

As various possible embodiments might be made of the above invention and as the embodiments above set forth might be varied and as the art herein described might be modified in various ways all without departing from the scope of the invention, it is to be understood that all matter herein set forth is to be interpreted as illustrative and not in a limiting sense.

I claim:—

1. The herein described art of preparing fur which consists in treating fur fibers with a liquid mixture of nitric acid and tannic acid, the liquid mixture being diluted with water.

2. The herein described art of preparing fur which consists in treating fur fibers with a solution of nitric acid and tannic acid, the solution being diluted with water, and having a strength of from 1 to 15 degrees Baumé.

3. The herein described art which consists in treating fur fibers with a liquid mixture of nitric acid and tannic acid, diluted in water, and in proportions to give the fur felting properties, then drying the fibers, and subjecting the fibers to felting action.

4. The herein described art which consists in treating fur fibers with a solution of nitric acid and tannic acid, in the proportion of 100 pounds nitric acid to 11 pounds tannic acid, diluted in water to give the fur felting properties.

5. The herein described art which consists in treating fur fibers with a solution of nitric acid and tannic acid, in the proportion of 100 pounds nitric acid to 11 pounds tannic acid, diluted in water and having a strength of from 1 to 15 degrees Baumé, to give the fur felting properties.

6. The herein described art which consists in treating fur fibers with a solution of nitric acid and tannic acid, in the proportion of 100 pounds nitric acid to 11 pounds tannic acid, diluted in water and having a strength of from 1 to 11 degrees Baumé, to give the fur felting properties.

7. A solution for carroting fur consisting of nitric acid, tannic acid, and water.

8. A solution for carroting fur consisting of nitric acid, tannic acid, in the proportion of nitric acid, 100 pounds, tannic acid, 11 pounds, and water.

9. A solution for carroting fur consisting of nitric acid, tannic acid, in the proportion of nitric acid, 100 pounds, tannic acid, 11 pounds, and water, to provide a solution of 1 to 15 degrees Baumé.

In testimony, that I claim the invention set forth above I have hereunto set my hand this 27th day of April, 1925.

PHILIP C. DONNER.